Sept. 11, 1934.  J. L. BROWN  1,973,047
BEARING
Filed April 4, 1930

INVENTOR
John L. Brown.
BY
Wesley G. Carr
ATTORNEY

Patented Sept. 11, 1934

1,973,047

UNITED STATES PATENT OFFICE 1,973,047

BEARING

John L. Brown, Verona, Pa., assignor to Westinghouse Electric & Manufacturing Company, a corporation of Pennsylvania Application April 4, 1930, Serial No. 441,518

11 Claims. (Cl. 308—189)

This invention relates to dynamo-electric machines and more particularly to ball or roller bearings for such machines.

Prior to my invention dynamo-electric machines having ball or roller bearings have been considerably more expensive than machines having sleeve bearings, for several reasons, among which are the following.

It has heretofore been necessary to provide two or more designs of bearing housings for machines having ball or roller bearings. This has been required because it is sometimes necessary to use bearings of some one of three different types, namely, single-row ball bearings, double-row ball bearings, and roller bearings. In many cases, a standard single-row ball bearing is ample to carry all of the stresses on the bearing. However, in cases where the machine is subject to momentary heavy loads the bearing stresses are much increased and it is sometimes necessary to use standard double-row ball bearings.

I propose to construct a single-row ball bearing with an inner raceway of such width and so located with respect to the outer raceway as to be interchangeable, in the motor assembly, with a standard double-row ball bearing. In this manner, it will be possible to use a single end-bell and bearing-housing for bearings of any one of the three types.

The main dimensions of ball bearings and their races were standardized before the latest developments in bearing material, design and workmanship. As a consequence of this, present-day ball bearings will withstand loads probably three times as great as they would carry at the time they were standardized.

The result of this increased loading, with old standardized dimensions, is that the inner raceway is too narrow and provides too little bearing surface upon the shaft for the loads which ball bearings are now called upon to carry. Thus, if the ball bearings are applied to a normal or unhardened shaft, the bearing race will sometimes peen the shaft and provide looseness between it and the inner race.

To prevent the peening of the shaft by the inner race, it has heretofore often been necessary to increase the toughness of the shaft by heat treatment, which entailed considerable additional expense, not only because heat-treated shafts are harder to work, but because they are also liable to be warped during heat treating, thus requiring the use of over-size stock in order to permit subsequent machining to proper shape and size. Thus, not only was the shaft harder to machine by reason of the heat treatment, but also a larger quantity of material had to be removed in order to produce a shaft of the desired form and size.

Even when hardened shafts were used, however, looseness frequently resulted from the crushing down of the shaft material. This is clearly shown in that, when a race is applied to the shaft, it will be found that it makes contact at points or small areas comprising only a comparatively small percentage of the mating surface. However, after the bearing has been run some time, it will be found to have ironed out and flattened down the contact points so as to make contact over the entire mating surface of the shaft. In this way, considerable looseness frequently developed.

I have eliminated the above-mentioned difficulties by increasing the width of the inner raceway so that the mating surfaces will be such as to prevent the peening of even unhardened shafts.

Where roller bearings have been utilized, another reason for their high cost has been the necessity of providing a threaded lock nut for the bearing, as a supplementary holding means and, consequently, the necessity of threading the shaft. Utilization of threaded lock nuts and corresponding threading of the shaft introduce additional cost, both in manufacture and assembly, as well as the hazard of the nuts backing off in service if improperly locked. I have discovered that, when a wide inner race is used, for either ball or roller bearings, a supplementary holding means is unnecessary, provided that the assembly is such that any axial thrust tends to drive the bearing toward the shoulder provided to be engaged by it.

It is an object of my invention to provide an improved dynamo-electric machine.

It is a further object of my invention to provide improved bearings for such machines.

It is a still further object of my invention to provide an improved ball or roller bearing.

It is a still further object of my invention to provide an improved closure element for anti-friction bearings.

It is a still further object of my invention to provide an improved lubricating system for an anti-friction bearing.

Still further objects and advantages of my invention will be apparent from the following detailed description, taken in conjunction with the appended drawing in which.

Figure 1:
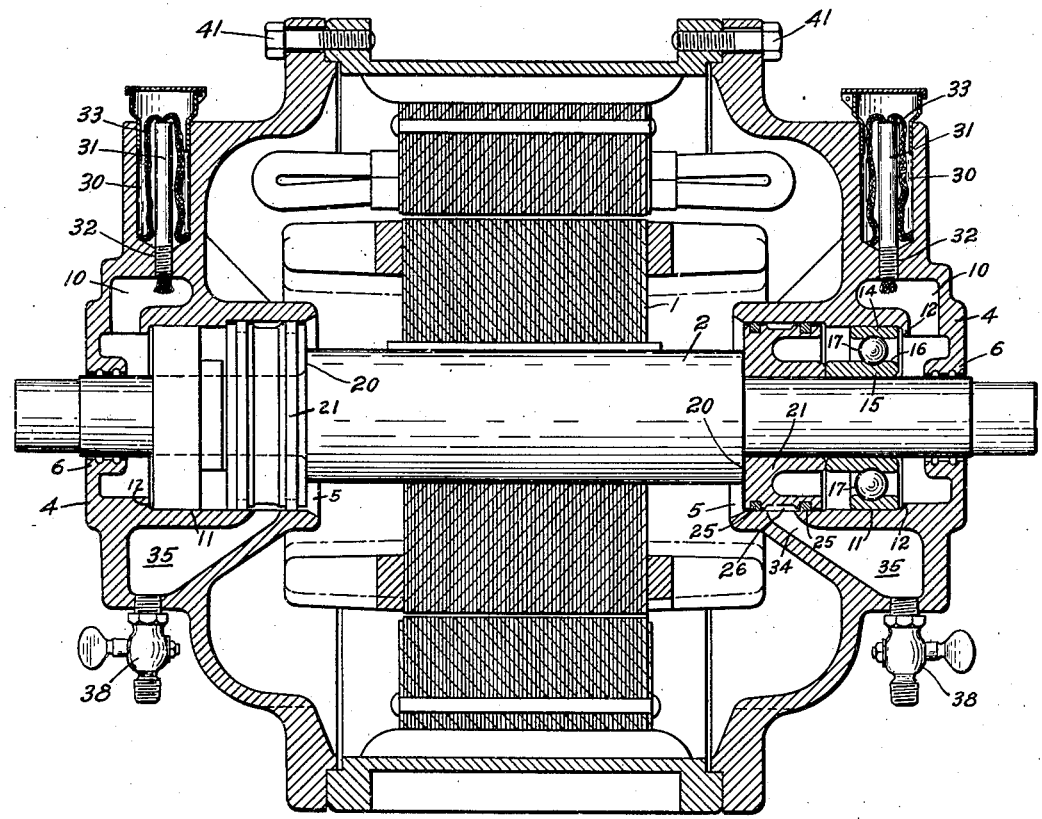
Figure 1 is a sectional elevation of a machine embodying my improvements.

The apparatus disclosed in the drawing comprises a dynamo-electric machine having a rotor 1 mounted on a shaft 2, the shaft 2, in turn, being mounted in two similar end bearings and housings 4. Since the bearings and their housings at the two ends of the machine are identical in structure; my description will be confined to one only of such structures.

The bearing housing 4 is provided with a bearing passage 5 of non-uniform diameter, the outer end of which is of restricted diameter to provide a lubricant seal 6 between the casing and the shaft. Immediately inside the restricted portion is an enlarged annular chamber 10 into which lubricating fluid will be conducted.

The central portion of the bearing housing is provided with a bearing seat 11 having a thrust-receiving shoulder 12. The outer race 14 of the bearing is seated in the seat 11 and may bear against the thrust-bearing shoulder 12 when a thrust load is applied.

The outer race 14 is of standard single-row ball-bearing size. Opposite the outer race is an inner race 15 having a width approximately equal to that of a standard double-row ball bearing. The raceway 16 is provided near the outer end of the inner race 15, the outer end of which is substantially flush with the outer end of the outer race. A set of standard anti-friction balls 17 is provided between the two races.

Between the inner race 15 and a shoulder 20 on the shaft, I provide a closure member which comprises a wiper ring 21 having sealing grooves 22 in the outer periphery thereof. Seated in the grooves 22 are sealing rings 25, which may be standard spring piston rings. Between the sealing rings is provided a clearance channel 26.

The portion of the bearing housing above the bearing proper is provided with an oil reservoir 30 in which is an upstanding tubular member 31 tapped into an opening 32 communicating with the enlarged oil-receiving passage 10 of the bearing. The tube 31 is preferably made of such length that its top will extend above the oil level in the oil reservoir.

In order to conduct oil from the reservoir into the bearing, a wick 33 is placed in the tube 31, with its outer end projecting downward into the reservoir. Oil will then be carried through the wick by capillary attraction and will drip, by gravity, into the lubricant chamber 10 of the bearing. The oil will overflow from the chamber 10 across the outer race 14 and thereby supply oil to the bearing.

After passing the bearing elements, the oil will come into contact with the first sealing ring 25 of closure element 21. However, as is well known, the oil will escape slowly past the first ring 25, and through a port 34 into an oil reservoir or sump 35 in the bottom of the housing. The oil is prevented from traveling axially along the periphery of the wiper ring 21 by the annular clearance channel 26 and the outer second ring 25. The oil may be removed from the sump 35 in any desired manner, as by a drain cock 38.

Figure 2:
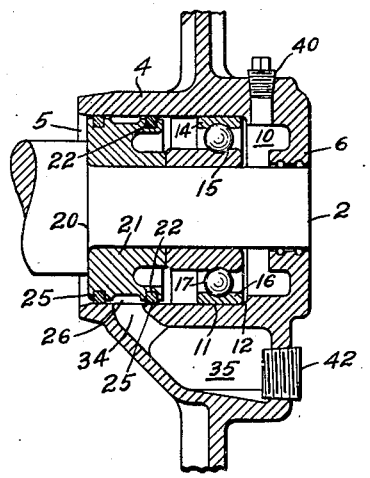
Fig. 2 is a sectional detail of one of my bearings, in slightly modified form.

Attention is particularly directed to the large size of the lubricant chamber 10, which also permits the use of grease for lubrication instead of oil. When it is intended that the machine shall be only grease-lubricated, the oil reservoir on top of the bearing may be omitted, and grease may be introduced through a threaded hole which is shown in Fig. 2 as being closed by a plug 40, by means of a standard alemite fitting, a compression grease cup or other means.

To assemble the machine, a complete bearing and closure element is assembled for each end of the shaft and the bearing housing will be slipped over the end of the shaft until the closure elements 21 come into intimate contact with the shoulder 20 on the shaft. The bearing housings will then be suitably secured in place, as by securing them to the motor frame by bolts 41, if the housings are of the end-bell type, as shown in Fig. 1. If pedestal bearings are used they may be secured to the foundation. In this manner, the rotor will not only be supported against lateral stresses but will also be supported against end play.

End play of the rotor will be transmitted to the closure element 21 by the shoulder 20 on the shaft. This, in turn, will be transmitted by the closure element to the inner bearing races 15 and from there, through the anti-friction elements, to the outer race 14 and to the thrust-bearing shoulders 12.

It will thus be seen that my ball or roller bearing may be assembled or dismantled with as little difficulty as a standard sleeve bearing and all without the necessity of removing or placing any bearing cover or lock nuts, or, in fact, any of the bolts or nuts usually met with in connection with ball or roller bearings. Also, the parts are few and all of such size that they are not liable to be lost or mislaid when assembling or dismantling a bearing, either in the shop or in the field.

Among other advantages to be gained by the use of my improved bearing are the following:

An unhardened shaft may be used, as the bearing area between the shaft and the inner race is sufficient to prevent the peening of the shaft material. This, in turn, permits the use of stock material only slightly larger than the finished shaft. This use of smaller stock than heretofore, in the case of heat-treated shafts, together with the elimination of the heat treatment, not only saves the cost of the larger stock and the heat-treating cost, but also saves a material part of the machining cost. A further advantage lies in the interchangeability of the various ball or roller bearings in the event of the motor being operated under changed load conditions, as well as being interchangeable for any specified load condition.

Also, the bearing is so designed that either oil or grease lubrication may be used without change in the motor or bearing. When oil lubrication is used, the sump 35 receives, by gravity, any oil escaping past the sealing ring 25; also, when grease is used, any grease that may be forced past the first sealing ring 25, from any cause, will flow into the sump 35, which, in this case, acts as a by-pass or relief chamber to prevent the grease from passing into the motor proper. When it is known that grease is to be used as a lubricant, it is preferable to provide a clean-out plug 42, instead of the drain cock 38, to facilitate the removal of the surplus grease from the sump 35.

Although I have shown and described certain specific embodiments of my invention, I am fully aware that many modifications thereof are possible. My invention, therefore, is not to be restricted except insofar as is necessitated by the prior art and by the spirit of the appended claims.

I claim as my invention:

1. A bearing assembly comprising a bearing housing, a bearing member in the housing, a closure member carried by the shaft for closing the inner end of said bearing, said closure member having a plurality of sealing grooves in its outer surface, and a sealing ring in each of said grooves, said housing having a cylindrical seat for said sealing rings and having a port opening between said sealing rings to collect any lubricant that may pass the sealing ring nearest to the bearing, said housing also having a second cylindrical seat, for the bearing member, characterized by the first-mentioned cylindrical seat being of at least as large a diameter as said second cylindrical seat in order to facilitate assembly and dismantling.

2. A bearing assembly comprising a bearing housing, a bearing member in the housing, a closure member carried by the shaft for closing the inner end of said bearing, said closure member comprising a plurality of sealing members disposed on its outer surface, said housing having a cylindrical seat for said sealing members, a lubricant-collecting chamber below said bearing member and means for bypassing surplus lubricant from between said sealing members to said chamber, said housing also having a second cylindrical seat, for the bearing member, characterized by the first-mentioned cylindrical seat being of at least as large a diameter as said second cylindrical seat in order to facilitate assembly and dismantling.

3. A bearing assembly for a shaft having an active bearing-seating portion and a shoulder at the inner end thereof, said assembly comprising a housing having a bearing-seat, an outer race within said seat, an inner race seatable on the active bearing-seating portion of said shaft and means associated with said shaft-shoulder to limit the inward sliding movement of said inner race on said shaft, means at the outer end of said bearing-seat for limiting the outward movement of the outer race, anti-friction means disposed between the two races and so arranged as to transmit axial thrust, said housing having a lubricating chamber adjacent to said races on the outside thereof, enclosure-means on the extreme outer axial end of said housing for providing a dirt-and-lubricant seal, said housing having a bore, at least as large in diameter as said bearing-seat, at the inner end of said bearing-seat, and closure-means between said shaft and said bore for providing a dust-and-lubricant seal.

4. A bearing assembly for a shaft having a bearing-seating portion and a shoulder at the inner end thereof, said assembly comprising a housing having a bearing-seat, an outer race within said seat, an inner race seatable on the bearing-seating portion of said shaft, a closure-ring seatable on said bearing-seating portion of said shaft between the shaft-shoulder and the inner race to limit the inward sliding movement of said inner race on said shaft, means at the outer end of said bearing seat for limiting the outward movement of the outer race, anti-friction means disposed between the two races and so arranged as to transmit axial thrust, said housing having a lubricating chamber adjacent to said races on the outside thereof, enclosure-means on the extreme outer axial end of said housing for providing a dirt-and-lubricant seal, said housing having a bore, at least as large in diameter as said bearing-seat, at the inner end of said bearing-seat, and means for providing a dust-and-lubricant seal between said closure-ring and said bore.

5. A bearing assembly for a shaft having a bearing-seating portion and a shoulder at the inner end thereof, said assembly comprising a housing having a bearing-seat, an outer race within said seat, an inner race seatable on the bearing-seating portion of said shaft, a closure-ring seatable on said bearing-seating portion of said shaft between the shaft-shoulder and the inner race to limit the inward sliding movement of said inner race on said shaft, means at the outer end of said bearing-seat for limiting the outward movement of the outer race, anti-friction means disposed between the two races and so arranged as to transmit axial thrust, said housing having a lubricating chamber adjacent to said races on the outside thereof and a sump-chamber at the bottom, enclosure-means on the extreme outer axial end of said housing for providing a dirt-and-lubricant seal, said housing having a bore, at least as large in diameter as said bearing seat, at the inner end of said bearing-seat, and means for providing a dust-and-lubricant seal between said closure-ring and said bore and for providing an excess-lubricant communication with said sump-chamber.

6. A bearing member for a shaft having a closure element and an inner race removably mounted thereon in side-by-side relation, with the inner race disposed on the side of the closure member toward the end of the shaft, an outer race, anti-friction members between said races, and a housing having seats for removably receiving said closure element and said outer race, and a lubricant-seal in cooperative relation to the shaft and in axially spaced relation to the seat for the outer race, so as to provide a lubricating space bordering on, and in communication with, said races and anti-friction members, said housing-seat for said closure element being of at least as large a diameter as said seat for the outer race in order to facilitate assembly and dismantling.

7. A bearing member for a shaft having an inner race removably mounted thereon, an outer race, anti-friction members between said races and so arranged as to transmit axial thrust, a housing having a seat for removably receiving said outer race, means for so mounting the parts of the bearing that the only thrust which can come on the anti-friction races is a thrust tending to push them further on the shaft, and for so limiting the axial movements of the inner and outer races, with respect to the shaft and the housing-seat, respectively, as to facilitate the removability of the parts of the bearing while avoiding all necessity for threaded joints or locknuts, said means comprising means including an integral shoulder on the shaft for permitting the inner race to be pressed inwardly on the shaft while restraining the inner race against being pressed inwardly beyond its predetermined position, a shoulder at the end of the housing-seat for the outer race, and a lubricant-seal in cooperative relation to the shaft and in axially spaced relation to the seat for the outer race, so as to provide a lubricant space bordering on, and in communication with, said races and anti-friction members.

8. A bearing assembly comprising a bearing member, an end closure element at each end of the bearing member, an inlet lubricant chamber at only one end of said bearing member and between said bearing member and the adjacent end closure element, an inlet means for fresh lubricant to be introduced into said inlet lubricant chamber, and a lubricant escape-chamber at only one end of said bearing member, between said bearing member and the adjacent end closure element, said inlet lubricant chamber and escape-chamber being associated with opposite ends of said bearing member, characterized by a third closure element disposed between the escape-chamber and the adjacent end of the bearing member for normally retarding the discharge of lubricant from said bearing member to said escape-chamber.

9. A bearing assembly for a shaft having an active bearing-seating portion and a shoulder at the inner end thereof, said assembly comprising a housing having a bearing-seat, an outer race within said seat, an inner race seatable on the active bearing-seating portion of said shaft and means associated with said shaft-shoulder to limit the inward sliding movement of said inner race on said shaft, means at the outer end of said bearing-seat for limiting the outward movement of the outer race, anti-friction means disposed between the two races and so arranged as to transmit axial thrust, said housing having a lubricating chamber adjacent to said races, enclosure-means on the extreme outer axial end of said housing for providing a dirt-and-lubricant seal, said housing having a bore, at least as large in diameter as said bearing-seat, at the inner end of said bearing seat, and closure-means between said shaft and said bore for providing a dust-and-lubricant seal.

10. A bearing assembly for a shaft having a bearing-seating portion and a shoulder at the inner end thereof, said assembly comprising a housing having a bearing-seat, an outer race within said seat, an inner race seatable on the bearing-seating portion of said shaft, a closure-ring seatable on the said bearing-seating portion of said shaft between the shaft-shoulder and the inner race to limit the inward sliding movement of said inner race on said shaft, means at the outer end of said bearing seat for limiting the outward movement of the outer race, anti-friction means disposed between the two races and so arranged as to transmit axial thrust, said housing having a lubricating chamber adjacent to said races, enclosure means on the extreme outer axial end of said housing for providing a dirt-and-lubricant seal, said housing having a bore, at least as large in diameter as said bearing-seat, at the inner end of said bearing-seat, and means for providing a dust-and-lubricant seal between said closure-ring and said bore.

11. A bearing assembly for a shaft having a bearing-seating portion and a shoulder at the inner end thereof, said assembly comprising a housing having a bearing-seat, an outer race within said seat, an inner race seatable on the bearing-seating portion of said shaft, a closure-ring seatable on said bearing-seating portion of said shaft between the shaft-shoulder and the inner race to limit the inward sliding movement of said inner race on said shaft, means at the outer end of said bearing-seat for limiting the outward movement of the outer race, anti-friction means disposed between the two races and so arranged as to transmit axial thrust, said housing having a lubricating chamber adjacent to said races and a sump-chamber at the bottom, enclosure-means on the extreme outer axial end of said housing for providing a dirt-and-lubricant seal, said housing having a bore, at least as large in diameter as said bearing seat, at the inner end of said bearing-seat, and means for providing a dust-and-lubricant seal between said closure-ring and said bore and for providing an excess-lubricant communication with said sump-chamber.

JOHN L. BROWN.